US008712335B2

(12) United States Patent
Mathur et al.

(10) Patent No.: US 8,712,335 B2
(45) Date of Patent: Apr. 29, 2014

(54) WIRELESS MONITORING IN PROCESS APPLICATIONS (75) Inventors: Anoop K. Mathur, Shoreview, MN (US); Soumitri N. Kolavennu, Minneapolis, MN (US)

(73) Assignee: Honeywell International Inc., Morristown, NJ (US)

( * ) Notice: Subject to any disclaimer, the term of this patent is extended or adjusted under 35 U.S.C. 154(b) by 2528 days.

(21) Appl. No.: 11/306,506

(22) Filed: Dec. 30, 2005

(65) Prior Publication Data

US 2007/0152813 A1 Jul. 5, 2007

(51) Int. Cl.
*H04B 7/24* (2006.01)
*H04B 17/00* (2006.01)

(52) U.S. Cl.
USPC .......................................... 455/67.11; 455/39

(58) Field of Classification Search
USPC ............................. 455/39, 507, 67.11, 67.12
See application file for complete search history.

(56) References Cited

U.S. PATENT DOCUMENTS

| | | | |
|---|---|---|---|
| 5,832,411 A * | 11/1998 | Schatzmann et al. ........... | 702/23 |
| 6,123,093 A | 9/2000 | D'Antonio et al. | |
| 6,252,510 B1 * | 6/2001 | Dungan ........................ | 340/632 |
| 6,772,071 B2 | 8/2004 | Gilbert et al. | |
| 6,796,187 B2 | 9/2004 | Srinivasan et al. | |
| 7,042,352 B2 * | 5/2006 | Kates .......................... | 340/539.1 |
| 7,376,760 B1 * | 5/2008 | Ivchenko et al. ................. | 710/8 |
| 2002/0147506 A1 | 10/2002 | Eryurek et al. | |
| 2003/0020480 A1 | 1/2003 | Maylotte et al. | |
| 2003/0147351 A1 * | 8/2003 | Greenlee ....................... | 370/232 |
| 2003/0227394 A1 * | 12/2003 | Rothgeb et al. .......... | 340/870.01 |
| 2004/0004554 A1 | 1/2004 | Srinivasan et al. | |
| 2005/0211934 A1 * | 9/2005 | Garber et al. ............ | 251/129.01 |
| 2005/0276749 A1 * | 12/2005 | Noujima et al. ........... | 423/658.2 |
| 2005/0277839 A1 * | 12/2005 | Alderman et al. ........... | 600/504 |
| 2006/0063523 A1 * | 3/2006 | McFarland .................... | 455/423 |

OTHER PUBLICATIONS

Frauenfelder, "The Smart Pigs Beneath Our Feet," http://www.thefeature.com/article?articleid=101020, 2 pages, printed Jan. 7, 2005.

* cited by examiner

*Primary Examiner* — Andrew Wendell
(74) *Attorney, Agent, or Firm* — Seager Tufte & Wickhem LLC.

(57) ABSTRACT

Monitoring systems and methods for monitoring one or more parameters within process equipment are disclosed. A monitoring system for wirelessly monitoring the process equipment can include a number of wireless sensors disposed within a fluid or gas process stream for monitoring various aspects of the fluid or gas medium such as temperature or pressure. Each of the wireless sensors can include a transmitter that can be used to wirelessly transmit sensor signals to a receiver in communication with a central monitoring unit. The wireless sensors can be placed directly within the fluid or gas medium, allowing accurate measurements to be taken within the process stream.

26 Claims, 9 Drawing Sheets

WIRELESS MONITORING IN PROCESS APPLICATIONS

FIELD

The present invention relates generally to the field of fluid or gas monitoring. More specifically, the present invention pertains to systems and methods for wirelessly monitoring fluids or gases in process applications.

BACKGROUND

The ability to accurately monitor fluids or gasses contained within processing equipment has become increasingly important in the efficient control and optimization of many industrial processes. In fluid separation applications involving the use of packed distillation or absorption columns, for example, the need to accurately monitor the temperature and concentration of fluids contained within the column may be valuable in hydrocarbon processing, solvent recycling, crude oil separation or other such applications where product quality and efficiency are important considerations. In other process applications such as the use of a bubble cap column for the distillation of fluids, the regulation of fluid height within each tray or plate may be necessary to ensure proper channeling of fluid and vapor through the column. Thus, by regulating various characteristics in the process equipment, optimization of the process can be achieved while also reducing plant costs associated with unnecessary power usage.

The monitoring of fluids or gasses in many process applications is often accomplished through the use of bulk measurements such as temperature or pressure. Typically, a wired fluid sensor is installed at the input or output of the particular process stream to be monitored, and bulk measurements are taken to establish an estimate of the process state. Depending on the particular process equipment used, installation of such sensors may be difficult or infeasible since the installation of the sensor may require the use of wire leads at prohibitive locations within the equipment or at locations otherwise incompatible with the process. In petrochemical applications involving the distillation of crude oil, for example, the elevated temperature and chemical composition of the oil may prohibit the insertion of a fluid sensor at certain locations within the process equipment. In some petrochemical applications, for example, the elevated temperature and chemical composition of the oil may prevent the installation of the sensor in the middle of the packed distillation column near the packing material. Hard-wiring of each fluid sensor within the equipment may also be cumbersome, particularly in those instances where the sensors are located far away from the control unit and/or where building codes and standards require the wires for such devices to be installed at particular locations for safety purposes.

In those cases where the use of wired fluid sensors is not prohibited, the measurements often obtained from such devices are not always representative of the actual in-situ conditions within the process since the fluid or gas may not be perfectly mixed or distributed within the process stream. This may be significant in some applications where local conditions depend on the distribution of reactants or catalysts at different points throughout the process.

SUMMARY

The present invention pertains generally to systems and methods for wirelessly monitoring fluids or gasses. An illustrative system for wirelessly monitoring one or more parameters within process equipment can include one or more wireless sensors disposed within a fluid or gas process stream, a receiver adapted to receive wireless signals transmitted by each of the wireless sensors, and a central monitoring unit in communication with the receiver and adapted to process the wireless signals received by the receiver. In some embodiments, one or more of the wireless sensors can be configured to transmit the wireless signals to a receiver located outside of the process stream. In other embodiments, one or more of the wireless sensors can be configured to transmit the wireless signals to a receiver located within the process stream. The wireless sensors can be installed at fixed locations within the process stream, or can be coupled to a host object that moves within the process stream.

The wireless sensors can be utilized in a variety of different applications for monitoring the operational status of process equipment. In one illustrative embodiment, for example, the wireless sensors can be coupled to the packings used in some distillation columns for separating liquids into a number of components, allowing parameters such as temperature and concentration to be directly measured within the column. In another illustrative embodiment, the wireless sensors can be provided on the bubble caps and downcomers of a bubble cap column, allowing parameters such as liquid height to be measured within the column.

An illustrative method of wirelessly monitoring one or more parameters within process equipment can include the steps of providing one or more wireless sensors within a fluid or gas process stream of the process equipment, sensing one or more parameters within the process stream using at least one of the wireless sensors, and transmitting a wireless signal to a receiver in communication with a central monitoring unit. The one or more parameters sensed by the wireless sensors can be compared against an expected set of process conditions to determine the current status of the process equipment. The central monitoring unit can then be configured to output a control signal to the process equipment based at least in part on the sensor signals received from the wireless sensors, allowing the central monitoring unit to adjust the operation of the process equipment using values directly sensed from within the process stream.

DETAILED DESCRIPTION

The following description should be read with reference to the drawings, in which like elements in different drawings are numbered in like fashion. The drawings, which are not necessarily to scale, depict selected embodiments and are not intended to limit the scope of the invention. Although several example process applications are provided to describe the various elements and steps herein, it should be understood that the present invention can be utilized to monitor a variety of other process applications in which in-situ fluid or gas measurements are desired.

Generally, the present invention pertains to systems and methods for monitoring fluids and/or gasses at one or more locations within process equipment. A number of wireless sensors can be positioned in-situ within a fluid or gas process stream to sense one or more parameters such as temperature, pressure, concentration, humidity, composition, flow rate, flow profile, location, height, etc., as desired. While the examples provided herein show the use of multiple wireless sensors at several illustrative locations within the process equipment, it should be understood that the number and location of the sensors can be varied from that specifically depicted.

Figure 1:
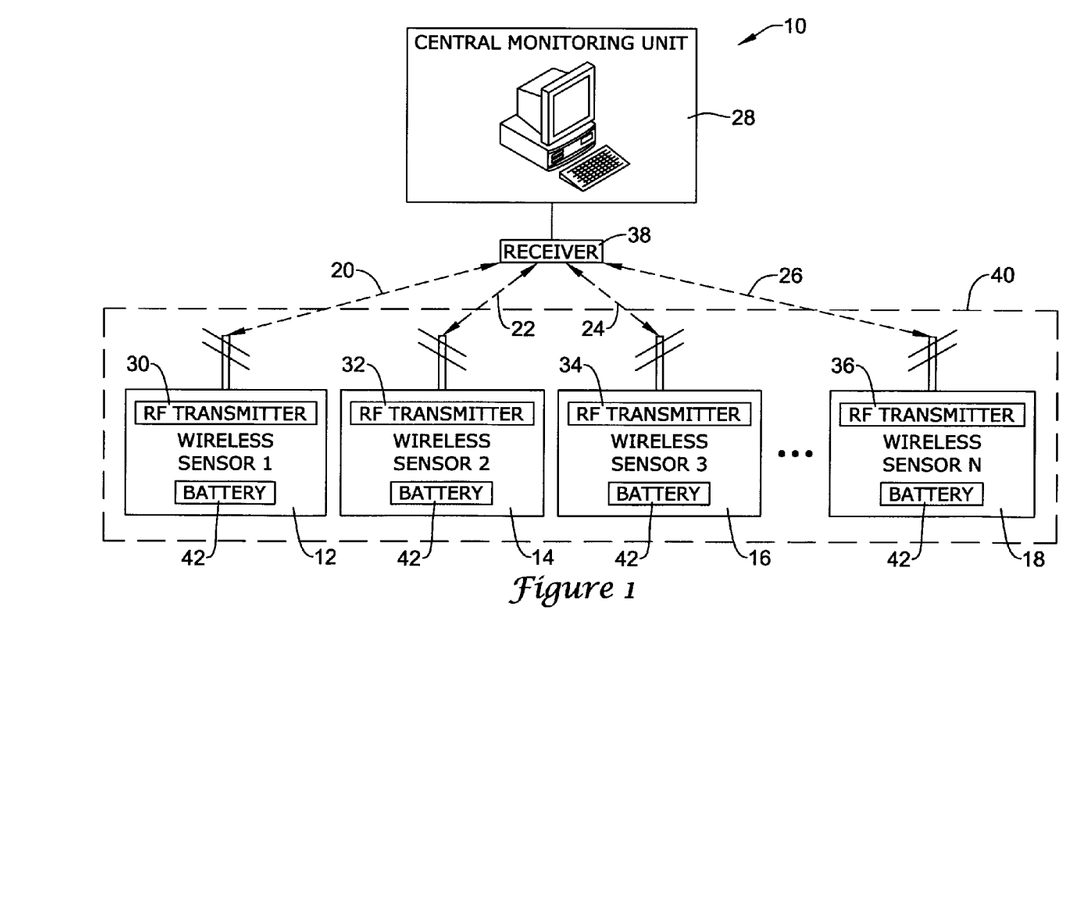
FIG. 1 is a schematic view showing an illustrative system for wirelessly monitoring fluids or gasses using a number of wireless sensors located within the interior of process equipment.

FIG. 1 is a schematic view showing an illustrative system 10 for wirelessly monitoring fluids or gasses using a number of wireless sensors located within the interior of process equipment. As shown in FIG. 1, system 10 can include one or more wireless sensors 12,14,16,18 each adapted to transmit a wireless signal 20,22,24,26 to a central monitoring unit 28. In the illustrative embodiment depicted, transmission of the wireless signals 20,22,24,26 can be accomplished via a respective RF transmitter 30,32,34,36 in communication with an RF receiver 38. In some embodiments, the RF receiver 38 can be configured as a transceiver, allowing wireless signals to also be sent to one or more of the wireless sensors 12,14,16,18 to activate the sensors at certain times, to power-down the sensors during periods of non-use, to change the settings of the sensors (e.g. pulse rate, transmission intensity, sensitivity, etc.), to test the operating status of the sensors, and/or to perform some other desired task or function. The transmitter 30,32,34,36 for each sensor 12,14,16,18 can be configured to transmit the signals 20,22,24,26 through physical barriers such as through the wall of a metal column or a concrete block, for example, allowing the sensors 12,14,16,18 to transmit signals from within the interior of the processing equipment 40 to a remote location outside of the equipment 40. The transmitter 30,32,34,36 for each sensor 12,14,16,18 will normally be capable of traversing interference caused by other electrical devices that produce electromagnetic (RF) waves.

The wireless sensors 12,14,16,18 can be placed at various locations within the interior of the process equipment 40 for sensing one or more parameters related to the fluid or gas therein. In some embodiments, for example, the wireless sensors 12,14,16,18 can be placed at various locations within a fluid or gas process stream of the process equipment 40 for sensing parameters such as temperature, pressure, concentration, humidity, composition, flow rate, flow profile, location, and/or height, which can be transmitted as signals 20,22,24, 26 to the central monitoring unit 28 for further analysis or processing. A first wireless sensor 12 of the system 10, for example, can be used to sense the temperature within a fluid column of the process equipment 40 whereas a second and third sensor 14,16 can be used to sense fluid pressure at several locations along the length of the fluid column. The number and/or configuration of sensors utilized may vary, however, depending on the particular process application to be monitored.

The wireless sensors 12,14,16,18 can be actively powered via a battery 42, capacitor, or other suitable power source. Alternatively, or in addition, the wireless sensors 12,14,16,18 can be passively powered using RF energy from the receiver 38 and/or from chemical or thermal energy contained within the fluid or gas stream. To conserve power, the wireless sensors 12,14,16,18 can be configured to output a pulsed signal. In other embodiments, the wireless sensors 12,14,16,18 can be configured to output a signal only when a particular event or threshold level is detected within the process equipment 40. In still other embodiments, the wireless sensors 12,14,16, 18 can be configured to output a continuous signal to the receiver 38. Other status information such as the charge state of the battery 42 and/or a tag identifying the particular wireless sensor 12,14,16,18 providing the signal 20,22,24,26 can also be transmitted, if desired.

The wireless sensors 12,14,16,18 can be made part of the process equipment 40, allowing the central monitoring unit 28 to monitor local conditions within the equipment 40. For example, the wireless sensors 12,14,16,18 can be coupled to or formed integrally with a heater, valve, column, tray, plate, tank, conduit, or other such structure within the process equipment 40. The wireless sensors 12,14,16,18 can be installed at fixed locations within the process equipment 40, or, alternatively, can be configured to move within the process equipment 40. In one such embodiment, for example, one or more of the wireless sensors 12,14,16,18 can be coupled to a host object moving through a fluid or gas process stream within the process equipment 40, allowing the sensors 12,14, 16,18 to sense one or more parameters as the host object traverses the stream.

Figure 2:
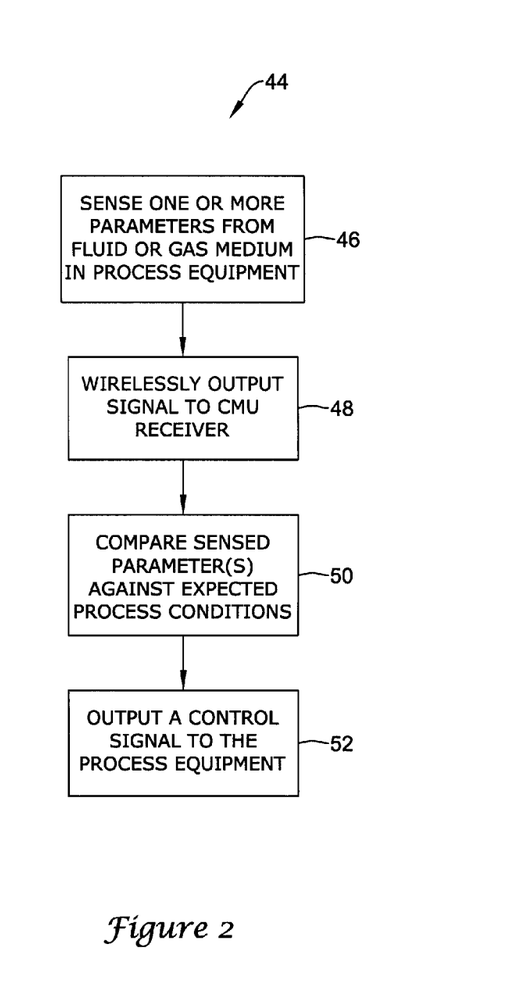
FIG. 2 is a schematic block diagram showing an illustrative method of wirelessly monitoring one or more parameters within process equipment.

Referring now to FIG. 2, a schematic block diagram showing an illustrative method 44 of wirelessly monitoring one or more parameters within process equipment will now be described. The method 44 may begin generally at block 46, wherein one or more parameters are sensed from a fluid or gas medium located within the process equipment. Sensing of the parameters may occur, for example, using one or more wireless sensors similar to that described above with respect to FIG. 1. In the monitoring of temperature within a distillation column, for example, one or more temperature sensors can be placed at various locations along the height of the column to locally monitor temperature gradients occurring therein, thus indicating whether the column is optimally mixed or may require additional heating. In the monitoring of gases within gas conditioning equipment, one or more gas detection sensors can be utilized to detect the presence and/or concentrations of particular gasses within the process stream.

Once one or more parameters are sensed by the wireless sensors, a signal can be wirelessly outputted by each sensor to a receiver in communication with a central monitoring unit, as shown generally by block 48. Outputting of the wireless signals may occur, for example, via an RF transmitter capable of transmitting a signal to a remote location external of the process equipment.

As each signal is received from the wireless sensors, the central monitoring unit can be configured to compare the sensed parameters against an expected set of process conditions or rules to determine the current state of the process equipment, as indicated generally by block 50. In those applications where wireless temperature sensors are employed to monitor the temperature within a fluid or gas column, for example, the central monitoring unit can be configured to receive a current temperature value and compare that value against a previous reference value to determine whether a change of temperature has occurred. A unique tag identifying the particular wireless sensor providing the signal can also be outputted to permit the central monitoring unit to identify those signals corresponding to each sensor when multiple sensors are employed. As indicated generally by block 52, the central monitoring unit can then be configured to output a control signal to the processing equipment to control some aspect of the process based at least in part on the sensor signals received from the wireless sensors.

Figure 3:
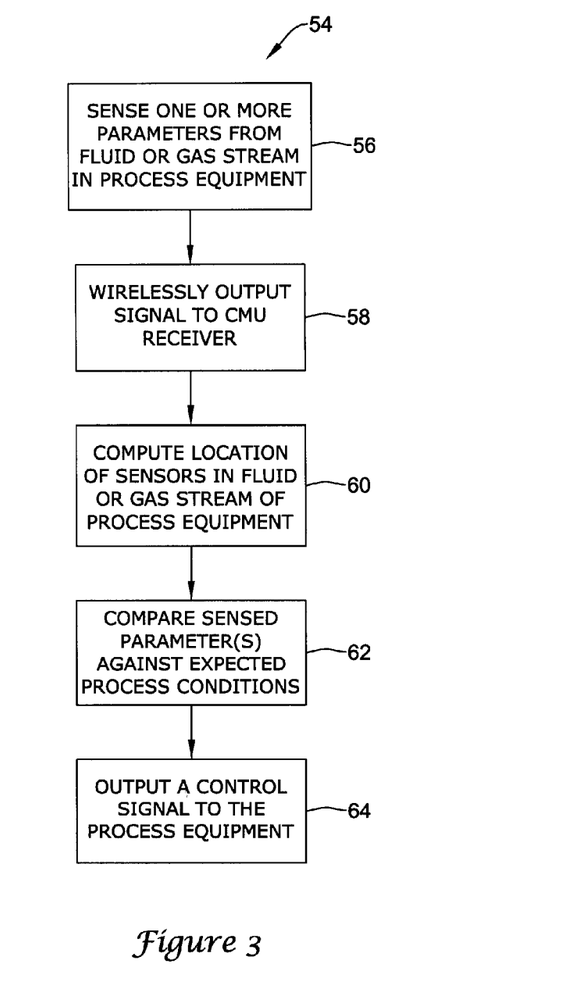
FIG. 3 is a schematic block diagram showing another illustrative method of wirelessly monitoring one or more parameters within process equipment.

FIG. 3 is a schematic block diagram showing another illustrative method 54 of wirelessly monitoring one or more parameters within process equipment. The method 54 may begin generally at block 56, wherein one or more parameters are sensed from a fluid or gas medium located within the process equipment. In the illustrative method of FIG. 3, sensing of the parameters may occur using one or more wireless sensors attached to a host object moving through a fluid or gas process stream, allowing the sensors to monitor one or more parameters relating to the fluid or gas stream and/or the host object as it travels through the stream. In the monitoring of fluid within a moving column of fluid or gas disposed within a pipe, for example, one or more wireless sensors may be attached to a host object to track parameters such as surface degradation along the pipe walls, indicating a possible crack or breach of the pipe.

Once one or more parameters are sensed by the wireless sensors moving within the fluid or gas stream, a signal can be wirelessly outputted to a receiver in communication with the central monitoring unit, as indicated generally by block 58. The signals received by the receiver can then be used by the central monitoring unit to determine the current location of each sensor within the process equipment, as further indicated generally by block 60. In certain embodiments, for example, one or more of the wireless sensors can be configured to output a signal including a unique tag identifier that can be used by the central monitoring unit to compute the location of the sensor within the process equipment. In one such technique, at least three wireless sensors can be configured to output signals which can be used by the central monitoring unit to compute the current location of each sensor within the process equipment using a stereo triangulation technique. In other embodiments, one or more of the wireless sensors may include a global positioning system (GPS) unit that can be used to output GPS coordinates to the central monitoring unit receiver based on reference signals obtained from a GPS satellite. Other techniques such as measuring the time between signal pulses or measuring the angle at which the signal is received at the receiver may also be utilized to determine the current location of each wireless sensor within the process equipment, if desired.

Once the central monitoring unit has determined the present location of each wireless sensor within the process equipment, the sensed values obtained can then be compared against an expected set of process conditions or rules to determine the current state of the process equipment, as indicated generally by block 62. As further indicated generally by block 64, the central monitoring unit can then be configured to output a control signal to the processing equipment to control some aspect of the process based at least in part on the sensor signals received from the wireless sensors.

Figure 4:
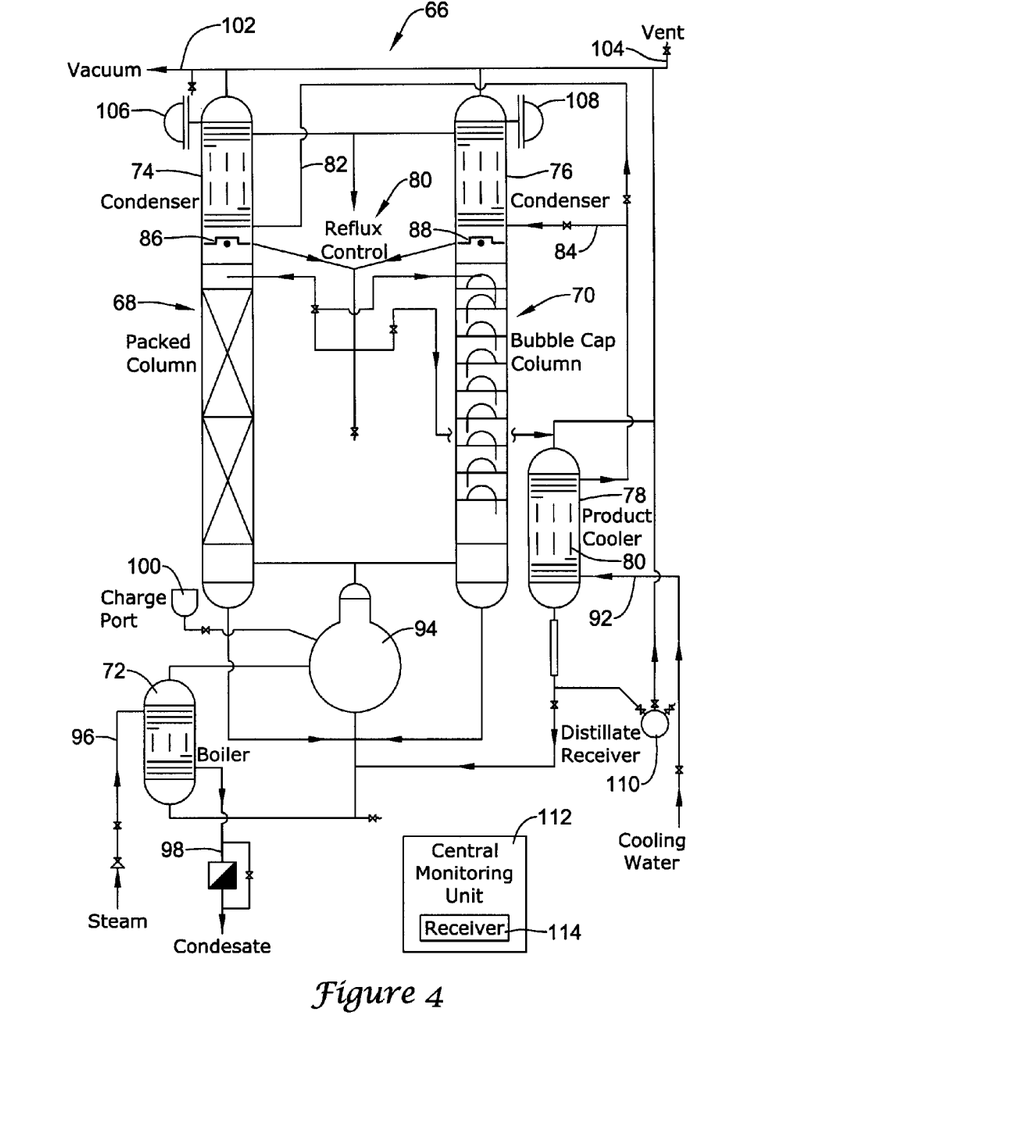
FIG. 4 is a schematic view showing an illustrative system of wirelessly monitoring fluids within distillation process equipment.

Referring now to FIG. 4, an illustrative system 66 of wirelessly monitoring fluids within distillation processing equipment will now be described. As shown in FIG. 4, the distillation processing equipment can generally include a packing column 68 and a bubble cap column 70 for the internal separation of liquid components, a boiler 72 for providing the vaporization of liquid within the columns 68,70, a number of upper vapor condensers 74,76 and a product cooler 78 for condensing the vapor located at the top of the columns 68,70, and a reflux control 80 for recycling the condensed vapor from the top of the columns 68,70 as liquid reflux or distillate.

The product cooler 78 can include a supply of feed 80 which can be fed through branch lines 82,84 into a respective feed tray 86,88 disposed within the packing and bubble cap columns 68,70. A supply of cooling water can be fed to the product cooler 78 via line 92, which can be recirculated through several cooling pipes to chill the feed 80 within the product cooler 78 to a particular temperature. As the chilled feed 80 enters the feed trays 86,88, it flows down the columns 68,70 where it is then collected within a thermosyphoning chamber 94.

Heat can be supplied by the boiler 72 to generate vapor within the chamber 94, causing the vapor to be introduced into each of the columns 68,70 and move upwardly towards the upper condensers 74,76. Typically, the heat supplied by the boiler 72 will be in the form of steam provided via line 96, which is circulated through the boiler 72 to heat the liquid within the chamber 94 and then subsequently discharged as condensate via line 98. A charge port 100 in communication with the chamber 94 can be provided to periodically inject fluids within the chamber 94 to maintain a desired pressure therein.

As the vapor rises towards the top of the columns 68,70, it is rapidly cooled by the condensers 74,76. A vacuum line 102 in communication with a vent line 104 can be provided to facilitate upward movement of the vapor through each of the columns 68,70. A number of bursting discs 106,108 can also be provided towards the top of each column 68,70 to provide a positive relief for any excessive pressure built-up within the columns 68,70. Once enriched within the upper section of the columns 68,70, the condensed liquid can then be removed and stored within a distillate receiver 110.

As can be further seen in FIG. 4, a central monitoring unit 112 can be provided as part of the monitoring system 66 to monitor the various internal flows of vapor and liquids within the columns 68,70 as well as the external flows of feeds and product streams. The central monitoring unit 112 can include a receiver 114, which, as is described in greater detail below, can be configured to receive various RF transmission signals from one or more wireless sensors located within the packed column 68, the bubble cap column 70, as well as other locations within the process equipment. In some embodiments, the receiver 114 can also function as a transceiver for sending wireless signals to one or more of the wireless sensors. The transmission of signals to the wireless sensors can be used, for example, to activate the sensors at certain times, to power-down the sensors during periods of non-use, to change the settings of the sensors, to test the operation of the sensors, and/or to perform some other desired task or function. Although the central monitoring unit 112 can be configured to receive signals transmitted from one or more wireless sensors located within the process equipment, it should be understood that the unit 112 can also be connected to other wired sensors and/or actuators for controlling other aspects of the distillation equipment, if desired.

Figure 5:
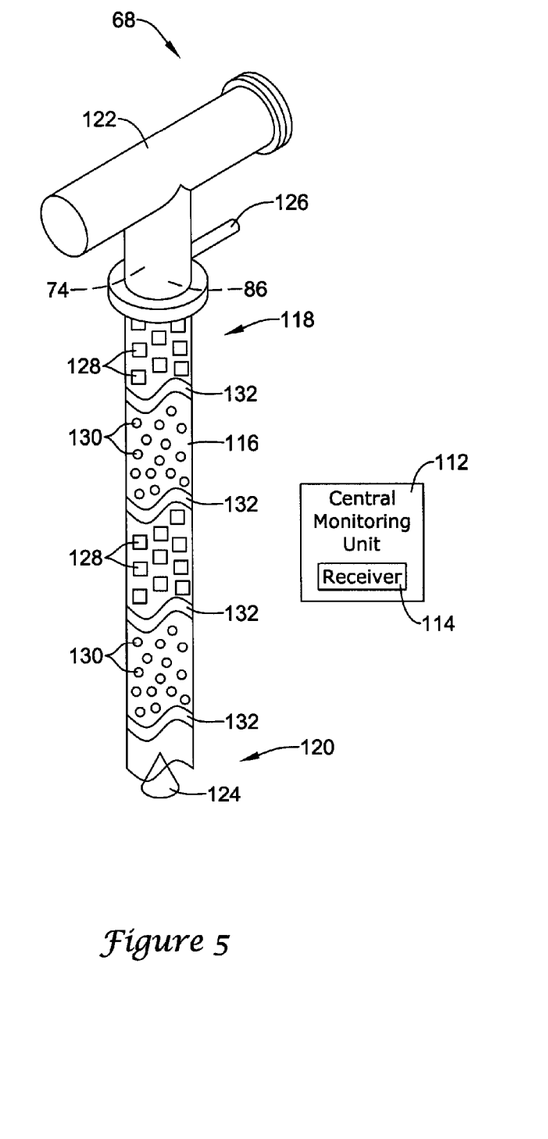
FIG. 5 is a schematic view showing the interior of the packing column of FIG. 4 in greater detail.

FIG. 5 is a schematic view showing the interior of the packing column 68 of FIG. 4 in greater detail. As shown in FIG. 5, the packing column 68 can include a substantially vertical column shell 116 having an upper section 118 and a lower section 120. The upper section 118 of the column shell 116 can be connected to the upper vapor condenser 74 and a conduit 122 in fluid communication with the vacuum and vent lines 102,104 described above with respect to FIG. 4. The lower section 120 of the column shell 116, in turn, can be connected to a support plate or cone 124. A feed line 126 can be further connected to the interior of the packing column 68, which permits the feed to be injected into the packing column 68 immediately below the vapor condenser 74 at or near the feed tray 86.

A number of packings 128,130 disposed within the interior of the packing column 68 can be used to increase the interfacial area for vapor-liquid contact as the liquid and vapor moves through the column 68 during the distillation process. In the illustrative embodiment of FIG. 5, for example, a first number of packings 128 are shown disposed at various locations along the height of the packing column 68 interspaced between a second number of packings 130. The packings 128,130 can be separated from each other in tiers via a number of saddles 132, which can be provided at various locations along the height of the packing column 68. The packings 128,130 can have any number of different shapes and/or configurations depending on the particular application. Examples of common packings may include, but are not limited to rings, structured packings, and/or knitted packings.

During distillation, it may be necessary to monitor the temperature at various locations along the height of the packing column 68 to control several aspects of the distillation process including the amount of heat provided by the boiler 72, the amount of cooling provided by the product cooler 78, and the flow rate of the feed 82 into the packing column 68. Traditionally, such temperature monitoring is accomplished using wired sensors located at the input and outputs to the packing column 68, or from wired sensors placed along the interior walls of the column shell 116 at a location away from the packings 128,130. While such wired sensors can be used to obtain bulk measurements of the fluid and vapor temperature within the packing column 68, it is often difficult to obtain accurate measurements within the interior of the packing column 68 due to the presence of the packings 128,130.

Figure 6:
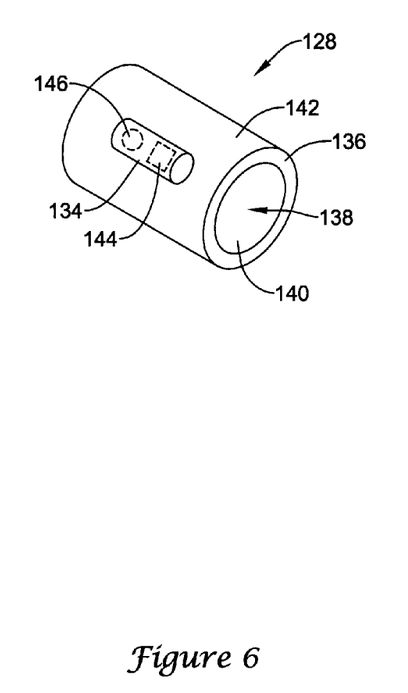
FIG. 6 is a schematic view showing a wireless fluid sensor coupled to one of the packings located within the packing column interior depicted in FIG. 5.

To permit temperature to be sensed within the interior of the packing column 68, one or more of the packings 128,130 can be equipped with a wireless temperature sensor capable of wirelessly transmitting signals to the central monitoring unit 112. An exemplary packing 128 incorporating a wireless temperature sensor 134 is illustrated in FIG. 6, which shows a Raschig ring 136 having an interior lumen 138, an inner surface 140, and an outer surface 142. In the illustrative embodiment of FIG. 6, the wireless sensor 134 is shown attached to the outer surface 142 of the ring 136, although other embodiments in which the sensor 134 is attached at other locations such as to the inner surface 140 or within the interior lumen 138 of the ring 136 are also contemplated. The wireless sensor 134 can include an RF transmitter 144, a power supply 146 such as a battery or capacitor, as well as other electronics that can be used to perform other functions such as identification, testing, modification of settings, etc.

Referring back to FIG. 5, each of the wireless sensors 134 within the interior of the packing column 68 can be configured to transmit an RF signal through the column shell 116 to the receiver 114, which can then be processed by the central monitoring unit 112 to control some aspect of the distillation process, if desired. If, for example, the signals received from each of the wireless sensors 134 indicate that the temperature gradient through the packing column 68 is insufficient to process the distillate at a sufficient rate, then the central monitoring unit 112 can be configured to output a signal to a valve to increase the flow of feed inputted into the columns 68,70 or to increase the heat provided by the boiler 72.

Figure 7:
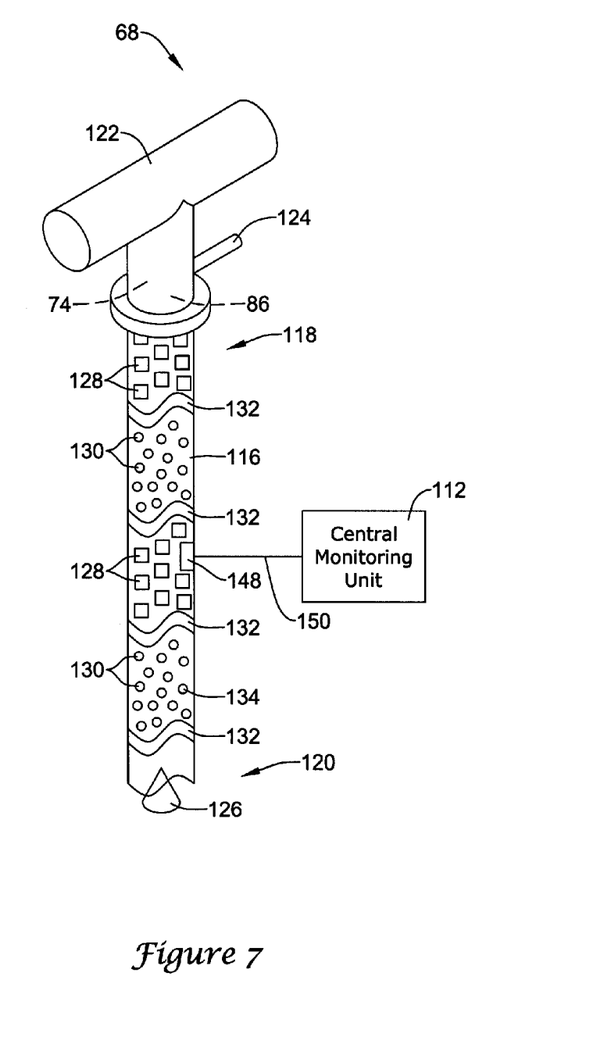
FIG. 7 is a schematic view showing another illustrative system of wirelessly monitoring fluid within the packing column interior depicted in FIG. 5.

In the illustrative embodiment of FIG. 5, each of the wireless sensors 134 are configured to individually transmit RF signals through the column shell 116 to a wireless receiver 114 in communication with the central monitoring unit 112. In an alternative embodiment depicted in FIG. 7, each of the wireless sensors 134 within the interior of the packing column 68 can be configured to transmit a wireless signal to a relay station 148 disposed along the interior wall of the column 68, which receives the wireless signals and relays those signals via a wired or wireless connection 150 to the central monitoring unit 112. During use, the relay station 148 allows the wireless sensors 134 to operate at lower power levels since the RF signals transmitted from the sensors 134 do not need to pass through the column shell 116.

Figure 8:
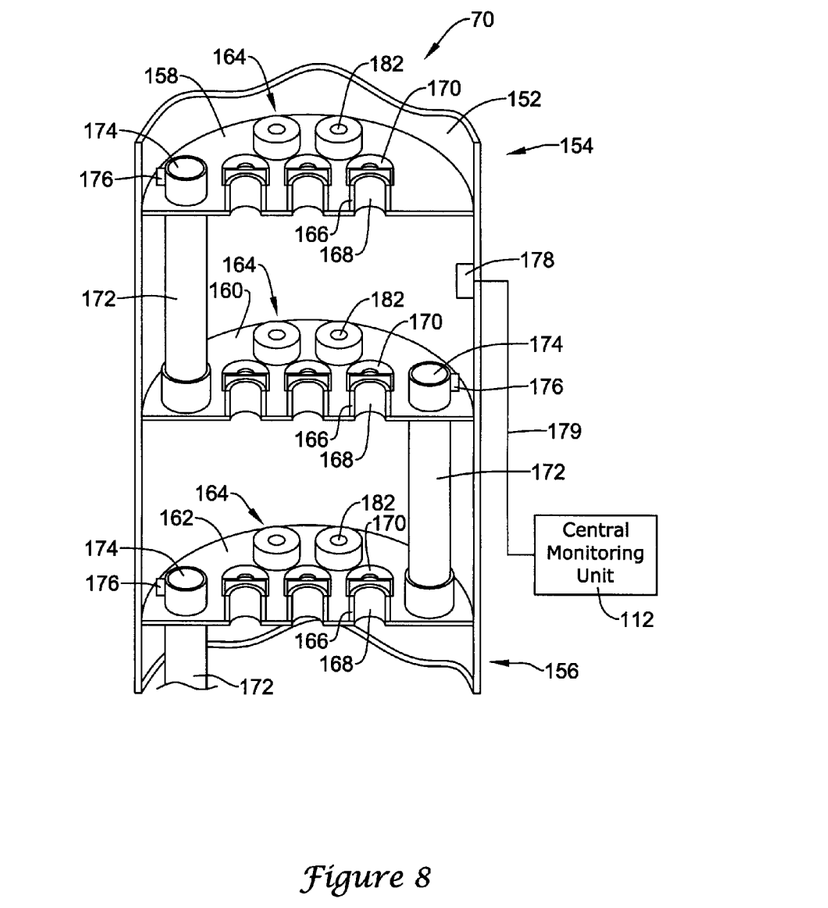
FIG. 8 is a schematic view showing the interior of the bubble cap column of FIG. 4 in greater detail.

Referring now to FIG. 8, a schematic view showing the interior of the bubble cap column 70 of FIG. 4 will now be described in greater detail. As shown in FIG. 8, the bubble cap column 70 can include a substantially vertical column shell 152 having an upper section 154 and a lower section 156. A number of bubble cap trays 158,160,162 disposed within the interior of the bubble cap column 70 can be configured to facilitate liquid-vapor separation in various stages through the column 70. In the illustrative view of FIG. 8, only three such bubble cap trays 158,160,162 are depicted. It should be understood, however, that a greater or lesser number of trays can be provided, depending on the application.

The bubble cap trays 158,160,162 can each be equipped with a number of bubble caps 164, each of which can include a riser 166 disposed over a corresponding hole 168 through the tray 158,160,162. Each of the risers 166 can be covered with a top cap 170, which can be mounted so as to provide a space between the risers 166 and the top caps 170 to permit the passage of vapor through the holes 168. The number and configuration of the bubble caps 164 can vary from that shown. In addition, while bubble caps trays 158,160,162 are specifically shown within the illustrative column 70, it should be understood that other types of trays such as valve trays or sieve trays could also be provided in lieu of, or in addition to, the bubble cap trays 158,160,162.

The bubble cap trays 158,160,162 can be connected together via a number of downcomers 172, which provide a conduit for the flow of liquid downwardly within the bubble cap column 70 due to gravity. A weir 174 provided on each bubble cap tray 158,160,162 ensures that there is always some liquid or holdup on the tray 158,160,162 to cover the bubble caps 164. During the distillation process, vapor flows up the bubble cap column 70 and is forced to pass through the liquid via the openings 168 on each bubble cap tray 158,160, 162. As the vapor passes through the liquid on the tray above, it transfers heat to the liquid, causing some of the vapor to condense adding to the liquid on the tray 158,160,162. This continuous interaction between the vapor and liquid occurs on each bubble cap tray 158,160,162 within the column 70, inducing a separation between the low boiling point components from those with higher boiling points.

To determine the level at which the liquid is forming over each bubble cap tray 158,160,162, one or more of the downcomers 172 can be equipped with a wireless sensor 176, which can be configured to sense fluid height above the bubble cap tray 158,160,162 and transmit a signal to the central monitoring unit 112 for further processing or analysis. The wireless sensors 176 can be configured to transmit a wireless signal through the column shell 152 to a receiver located external to the bubble cap column 70. Alternatively, and as shown in FIG. 8, the wireless sensors 176 can be configured to transmit wireless signals to a relay station 178 located along the interior wall of the bubble cap column 70, which receives the wireless signals from each sensor 176 and relays those signals via a wired or wireless connection 179 to the central monitoring unit 112.

Figure 9:
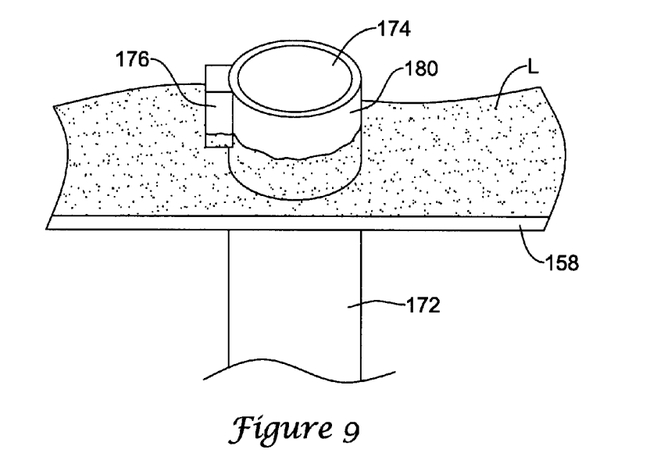
FIG. 9 is a schematic view showing a wireless fluid sensor coupled to one of the downcomers located within the bubble cap column interior depicted in FIG. 8.

FIG. 9 is a schematic view showing a wireless fluid sensor 176 coupled to one of the downcomers 172 located within the bubble cap column 70 interior depicted in FIG. 8. As can be seen in FIG. 9, the wireless sensor 176 can be coupled to the outer side 180 of the weir 174, and can be tasked to sense the level of liquid L above the bubble cap tray 158. Using the signals received from each of the wireless sensors 176, the central monitoring unit 112 can be configured to adjust one or more parameters within the bubble cap column 70. In some embodiments, for example, the central monitoring unit 112 can be configured to monitor the height of the liquid above each bubble cap tray 158,160,162 so that each of the bubble caps 164 are continuously immersed in liquid.

Figure 10:
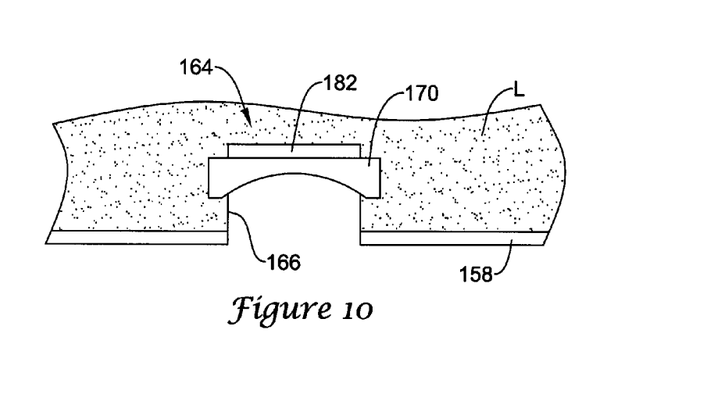
FIG. 10 is a schematic view showing a wireless fluid sensor coupled to one of the bubble caps located within the bubble cap column interior depicted in FIG. 8.

In some embodiments, and as further shown in FIG. 8, one or more of the bubble caps 164 can include a wireless temperature sensor 182 that can be used to measure the temperature of the liquid/vapor mixture above each of the bubble cap trays 158,160,162. In one such embodiment depicted in FIG. 10, for example, the wireless sensor 182 can comprise a temperature sensor coupled to the top cap 170, allowing the sensor 182 to sense temperature fluctuations within the liquid immediately above the bubble cap 164. The temperature sensed above the bubble cap 164 can then be wirelessly transmitted to the relay station 178 or, alternatively, to a receiver located external to the bubble cap column for further processing by the central monitoring unit 112, if desired.

Having thus described the several embodiments of the present invention, those of skill in the art will readily appreciate that other embodiments may be made and used which fall within the scope of the claims attached hereto. Numerous advantages of the invention covered by this document have been set forth in the foregoing description. It will be understood that this disclosure is, in many respects, only illustrative. Changes can be made with respect to various elements described herein without exceeding the scope of the invention.

What is claimed is:

1. A monitoring system for wirelessly monitoring one or more parameters of a fluid or gas process stream within process equipment, the process equipment having one or more control inputs for controlling the fluid or gas process stream, the monitoring system comprising:
    one or more wireless sensors disposed within a fluid or gas process stream of the process equipment, each of said one or more wireless sensors including a transmitter configured to transmit a wireless signal, wherein at least one of said one or more wireless sensors is installed at a fixed non-movable location within the fluid or gas process stream;
    a receiver configured to receive the wireless signals transmitted from said one or more wireless sensors; and
    a central monitoring unit in communication with the receiver, the central monitoring unit processing the wireless signals received by the receiver, and in response modifying one or more of the control inputs of the process equipment to affect a desired change in the fluid or gas process stream.

2. The monitoring system of claim 1, wherein the receiver is located outside of the fluid or gas process stream.

3. The monitoring system of claim 1, wherein the receiver is located within the fluid or gas process stream.

4. The monitoring system of claim 1, wherein said wireless signal is an RF wireless signal.

5. The monitoring system of claim 1, wherein said process equipment includes distillation process equipment.

6. The monitoring system of claim 5, wherein said process stream includes a packing column.

7. The monitoring system of claim 6, wherein at least one of said one or more wireless sensors is coupled to packing material disposed within the packing column.

8. The monitoring system of claim 5, wherein said process stream includes a bubble cap column.

9. The monitoring system of claim 8, wherein at least one of said one or more wireless sensors is coupled to a bubble cap disposed within the bubble cap column.

10. The monitoring system of claim 8, wherein at least one of said one or more wireless sensors is coupled to a downcomer disposed within the bubble cap column.

11. A monitoring system for wirelessly monitoring one or more parameters of a fluid or gas process stream within process equipment, the process equipment having one or more control inputs for controlling the fluid or gas process stream, the monitoring system comprising:
    one or more wireless sensors disposed within a fluid or gas process stream of the process equipment, each of said one or more wireless sensors including a transmitter configured to transmit a wireless signal, wherein at least one of said one or more wireless sensors is coupled to a host object that flows downstream with the fluid or gas process stream;
    a receiver configured to receive the wireless signals transmitted from said one or more wireless sensors; and
    a central monitoring unit in communication with the receiver, the central monitoring unit processing the wireless signals received by the receiver, and in response modifying one or more of the control inputs of the process equipment to affect a desired change in the fluid or gas process stream.

12. A monitoring system for wirelessly monitoring one or more parameters of a fluid or gas process stream within process equipment, the process equipment having one or more control inputs for controlling the fluid or gas process stream, the monitoring system comprising:
    one or more wireless sensors disposed within a fluid or gas process stream of the process equipment, each of said one or more wireless sensors including a transmitter configured to transmit a wireless signal wherein at least one of said one or more wireless sensors is an object that flows downstream with the fluid or gas process stream;
    a receiver configured to receive the wireless signals transmitted from said one or more wireless sensors; and
    a central monitoring unit in communication with the receiver, the central monitoring unit processing the wireless signals received by the receiver, and in response modifying one or more of the control inputs of the process equipment to affect a desired change in the fluid or gas process stream.

13. A method of wirelessly monitoring one or more parameters within process equipment, the method comprising the steps of:
    providing two or more wireless sensors within a fluid or gas process stream of the process equipment, wherein a first one of the two or more wireless sensors is positioned downstream of a second one of the two or more wireless sensors, and wherein each of said two or more wireless sensors including a transmitter;

sensing one or more parameters within the process stream using the first and second wireless sensors; and transmitting a wireless signal from each of the first and second wireless sensors to a receiver in communication with a central monitoring unit.

14. The method of claim 13, further comprising the steps of:

comparing one or more parameters sensed by the first and second wireless sensors against an expected set of process conditions within the process equipment; and outputting a control signal to the process equipment for controlling the equipment based at least in part on the first and second wireless signals received from the first and second wireless sensors.

15. The method of claim 13, wherein the receiver is located outside of the fluid or gas process stream.

16. The method of claim 13, wherein the receiver is located within the fluid or gas process stream.

17. The method of claim 13, wherein at least one of the two or more wireless sensors is installed at a fixed non-movable location within the process stream.

18. The method of claim 13, wherein at least one of the two or more wireless sensors is coupled to a host object that flows downstream with the fluid or gas process stream.

19. The method of claim 18, further comprising the step of determining the location of each wireless sensor that is coupled to the host object.

20. A monitoring system for wirelessly monitoring one or more parameters of a fluid or gas process stream within process equipment, the process equipment having one or more control inputs for controlling the fluid or gas process stream, the monitoring system comprising:

one or more wireless sensors disposed within a fluid or gas process stream of the process equipment, each of said one or more wireless sensors including a transmitter configured to transmit a wireless signal and a receiver for receiving wireless signals and wherein at least one of the one or more sensors is installed at a fixed non-movable location within the fluid or gas process stream;

a transceiver configured to receive the wireless signals transmitted from said one or more wireless sensors and to transmit wireless signals to said one or more wireless sensors; and a controller in communication with the receiver, the controller configured to process the wireless signals received by the receiver and to modify one or more of the control inputs of the process equipment to affect a desired change in the fluid or gas process stream, the controller further configured to selectively provide one or more instructions to the one or more wireless sensors via the transceiver to selectively change one or more operating characteristics of the one or more wireless sensors.

21. The monitoring system of claim 20 wherein the one or more operating characteristics that can be selectively changed by the controller include activating a wireless sensor at a certain time.

22. The monitoring system of claim 20 wherein the one or more operating characteristics that can be selectively changed by the controller include powering-down a wireless sensor during a period of non-use.

23. The monitoring system of claim 20 wherein the one or more operating characteristics that can be selectively changed by the controller include changing a transmission intensity of a wireless sensor.

24. The monitoring system of claim 20 wherein the one or more operating characteristics that can be selectively changed by the controller include changing a sensitivity of a wireless sensor.

25. The monitoring system of claim 23 wherein the one or more operating characteristics that can be selectively changed by the controller include transmitting a charge state of a battery of a wireless sensor.

26. The monitoring system of claim 23 wherein the one or more operating characteristics that can be selectively changed by the controller include transmitting a identifying the particular wireless sensor.

* * * * *